US010812250B2

(12) United States Patent
Lee et al.

(10) Patent No.: US 10,812,250 B2
(45) Date of Patent: Oct. 20, 2020

(54) TIME-DIVISION MULTIPLE ACCESS WITH OVERLAPPED PREAMBLE

(71) Applicant: Hughes Network Systems, LLC, Germantown, MD (US)

(72) Inventors: Lin-Nan Lee, Potomac, MD (US); Liping Chen, Bethesda, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/720,124

(22) Filed: Sep. 29, 2017

(65) Prior Publication Data

US 2019/0103955 A1  Apr. 4, 2019

(51) Int. Cl.
*H04L 5/22* (2006.01)
*H04J 11/00* (2006.01)
(Continued)

(52) U.S. Cl.
CPC ............ *H04L 5/225* (2013.01); *H04J 11/004* (2013.01); *H04L 5/0016* (2013.01); *H04L 5/26* (2013.01); *H04W 72/1278* (2013.01)

(58) Field of Classification Search
CPC ......... H04L 5/225; H04L 5/0016; H04L 5/26; H04W 72/1278
See application file for complete search history.

(56) References Cited

U.S. PATENT DOCUMENTS

| 4,839,887 | A | * | 6/1989 | Yano | ....................... | H04L 12/44 |
| | | | | | | 370/396 |
| 8,660,056 | B2 | * | 2/2014 | Tan | .................... | H04B 7/15592 |
| | | | | | | 370/315 |

(Continued)

FOREIGN PATENT DOCUMENTS

| EP | 2461514 A2 | 6/2012 |
| WO | 2017087913 A1 | 5/2017 |

OTHER PUBLICATIONS

Alimi R et al: "iPack: in-Network Packet Mixing for High Throughput Wireless Mesh Networks", INFOCOM 2008. The 27th Conference on Computer Communications. IEEE, IEEE, Piscataway, NJ, USA, Apr. 13, 2008 (Apr. 13, 2008), XP032446935, DOI: 10.1109/INFOCOM.2008.22, ISBN: 978-1-4244-2025-4, Section II.

(Continued)

*Primary Examiner* — Tim T Vo
*Assistant Examiner* — Harry Z Wang
(74) *Attorney, Agent, or Firm* — Bejin Bieneman PLC

(57) ABSTRACT

Interference cancellation in a receiver can be used to improve bandwidth efficiency. The transmission of bursts from different terminals scheduled at separate time intervals can overlap partially such that time used for information transmission is optimized. For example, a receiver includes a signal processor including instructions executable to select first data including a first burst and a successive second burst from a transmission. The signal processor demodulates and decodes information from the first burst. The signal processor further generates a remodulated first burst based on recoded and remodulated information and generates second data by subtracting the remodulated first burst from the first data. The signal processor synchronizes with a stored symbol pattern in the second burst; and demodulates and decodes the information from the second burst. With such arrangement, the performance of each link is not affected by the partially overlapping burst.

14 Claims, 11 Drawing Sheets

(51) Int. Cl.
  *H04L 5/00* (2006.01)
  *H04L 5/26* (2006.01)
  *H04W 72/12* (2009.01)

(56) References Cited

U.S. PATENT DOCUMENTS

| | | | | |
|---|---|---|---|---|
| 2007/0165757 | A1* | 7/2007 | Heiman | H04B 7/0854 375/347 |
| 2011/0051832 | A1* | 3/2011 | Mergen | H04B 7/0452 375/267 |
| 2011/0150254 | A1* | 6/2011 | Solum | H04R 25/554 381/314 |
| 2012/0051273 | A1* | 3/2012 | Febvre | H04L 1/0045 370/310 |
| 2013/0077551 | A1* | 3/2013 | Lo | H04W 16/14 370/312 |
| 2013/0121320 | A1* | 5/2013 | Vutukuri | H04J 11/0036 370/337 |
| 2013/0294494 | A1* | 11/2013 | Wang | H04B 1/71055 375/233 |
| 2014/0269605 | A1* | 9/2014 | Pecen | H04W 56/00 370/330 |
| 2015/0063340 | A1* | 3/2015 | Cai | H04W 74/0825 370/338 |

OTHER PUBLICATIONS

Sinha A K: "A model for TOMA burst assignment and scheduling", Comsat Technical Rev, Communications Satellite Corporation. Washington, US, vol. 6, Jan. 1, 1976 (Jan. 1, 1976), pp. 219-251, XP008157660, ISSN: 0095-9669 p. 225-p. 227.

International Search Report and Written Opinion in PCT/US2018/052250 dated Jan. 14, 2019.

International Preliminary Report on Patentability for PCT/US2018/052250 dated Apr. 9, 2020 (8 pages).

Alimi R et al: "iPack: in-Network Packet Mixing for High Throughput Wireless Mesh Networks", INFOCOM 2008. The 27th Conference on Computer Communications. IEEE, IEEE, Piscataway, NJ, USA, Apr. 13, 2008, XP032446935, DOI: 10.1109/INFOCOM.2008.22, ISBN: 978-1-4244-2025-4 (abstract provided).

Sinha A K: "A model for TDMA burst assignment and scheduling", COMSAT Technical Rev, Communications Satellite Coproration. Washington, US, vol. 6, Jan. 1, 1976 (Jan. 1, 1976), pp. 2191-251, XP008157660, ISSN: 0095-9669.

\* cited by examiner

TIME-DIVISION MULTIPLE ACCESS WITH OVERLAPPED PREAMBLE

BACKGROUND

Time-Division Multiple Access (TDMA) is used by satellite and wireless communication systems for multiple terminals to share a same transmission channel one at a time. A network controller issues a schedule to one or more terminals sharing the transmission channel indicating timeslots available to the respective terminal for transmitting bursts. Each burst includes a payload, and an additional preamble pattern used for synchronization. Additionally, because terminals are not perfectly synchronized in time, a guard time is included between the transmission duration of different terminals in traditional TDMA systems to avoid overlapping of bursts. As the speed of transmission increases, the percentage of channel access time devoted to guard times increases. Wasted data carrying capacity may result in reduced performance for the transmission channel such as reduced throughput for individual terminals sharing the transmission channel. Wasted data carrying capacity may further result in reducing the number of terminals that can be served by a transmission channel, ultimately requiring a communications provider to increase a number of transmission channels used to serve, for example, a geographic area.

SUMMARY

An exemplary receiver includes a signal processor; and a memory, the memory storing instructions executable by the signal processor to select first data including a first burst and a successive second burst from a transmission, demodulate and decode, then recode and remodulate, first information from the first burst. The instructions are further executable to generate a first remodulated first burst based on the recoded and remodulated first information from the first burst, generate second data by subtracting the first remodulated first burst from the first data, synchronize with a second stored symbol pattern in the second burst based on the second data, and demodulate and decode first information from the second burst.

In another example, the instructions are further executable to output at least one of decoded information from the first burst based on the demodulated and decoded first information from the first burst and decoded information from the second burst based on the demodulated and decoded first information from the second burst.

In another example, the second stored symbol pattern includes at least one of a second preamble pattern, a second mid-amble pattern and a second post-amble pattern.

In another example, the instructions are further executable to synchronize with a first stored symbol pattern in the first burst, determine a first burst range based on a length of the first burst and the synchronization with the first stored symbol pattern in the first burst, and demodulate and decode and the first information from the first burst based on the determination of the first burst range.

In another example, the instructions are further executable to determine a second burst range based on a length of the second burst and the synchronization with the second stored symbol pattern, and demodulate and decode the first information from the second burst based on the determination of the second burst range.

In another example, the instructions are further executable to generate a first remodulated second burst based on the demodulated and decoded first information from the second burst, generate third data by subtracting the first remodulated second burst from the second burst range of the second data, generate fourth data by adding the first remodulated first burst to the first burst range of the third data. The instructions are further executable to synchronize with the first stored symbol pattern in the first burst based on the fourth data, and demodulate and decode the first burst to generate a second decoded information from the first burst, based on synchronization with the first stored symbol pattern in the first burst based on the fourth data.

In another example, the instructions are further executable to generate a second remodulated first burst by recoding and remodulating the second decoded information from the first burst generate fifth data by subtracting the second remodulated first burst from the fourth data, generate sixth data by adding the first remodulated second burst to the second range of the fifth data, synchronize with the second stored symbol pattern in the second burst based on the sixth data; and generate a second decoded information from the second burst by demodulating and decoding the second burst.

In another example, the instructions are further executable to output at least one of the second decoded information from the first burst and the second decoded information from the second burst.

In another example, the first burst includes a first payload, the second burst includes a second preamble, and a portion of the second preamble overlaps a portion of the first payload.

An exemplary method includes selecting first data including a first burst and a successive second burst from a transmission, demodulating and decoding first information from the first burst, generating a first remodulated first burst based on recoded and remodulated first information from the first burst, generating second data by subtracting the first remodulated first burst from the first data, synchronizing with a second stored symbol pattern in the second burst based on the second data, and demodulating and decoding first information from the second burst.

In another example, the method includes outputting at least one of decoded information from the first burst based on the demodulated and decoded first information from the first burst and decoded information from the second burst based on the demodulated and decoded first information from the second burst.

In another example, the method includes synchronizing with a first stored symbol pattern in the first burst determining a first burst range based on a length of the first burst and the synchronization with the first stored symbol pattern in the first burst, and demodulating and decoding and the first information from the first burst based on the determination of the first burst range.

In another example, the method includes determining a second burst range based on a length of the second burst and the synchronization with the second stored symbol pattern in the second burst, and demodulating and decoding the first information from the second burst based on the determination of the second burst range.

In another example, the method includes generating a first remodulated second burst based on the demodulated and decoded first information from the second burst, generating third data by subtracting the first remodulated second burst from the second burst range of the second data, generating fourth data by adding the first remodulated first burst to the first burst range of the third data, synchronizing with the first stored symbol pattern in the first burst based on the fourth data, and demodulating and decoding the first burst to generate a second decoded information from the first burst, based on synchronization with the first stored symbol pattern in the first burst based on the fourth data.

In another example, the method includes generating a second remodulated first burst by recoding and remodulating the second decoded information from the first burst, generating fifth data by subtracting the second remodulated first burst from the fourth data, generating sixth data by adding the first remodulated second burst to the second range of the fifth data, synchronizing with the second stored symbol pattern in the second burst based on the sixth data, and generating a second decoded information from the second burst by demodulating and decoding the second burst.

In another example, the method includes outputting at least one of the second decoded information from the first burst and the second decoded information from the second burst.

In another example, the first burst includes a first payload, the second burst includes a second preamble, and a portion of the second preamble overlaps a portion of the first payload.

In another example, the method includes transmitting, by a terminal, the second preamble in the second burst at a first power level and a second payload in the second burst at a second power level, wherein the first power level is lower than the second power level.

An exemplary method includes scheduling a first transmission of a first burst at a first time, and scheduling a second transmission of a second burst at a second time, the second time determined such that a scheduled transmission of a portion of the second burst overlaps a scheduled transmission of a portion of the first burst.

According to another example, the first burst includes a first payload and the second burst includes a second payload and the method includes determining the second time such that a scheduled transmission of the second payload begins a time period after an end of a scheduled transmission of the first payload, the time period determined to ensure that an uncertainty in a timing of a first transmitter transmitting the first burst relative to a timing of a second transmitter transmitting the second burst does not result in a transmission of the second payload overlapping a transmission of the first payload.

DRAWINGS

DETAILED DESCRIPTION

Figure 1:
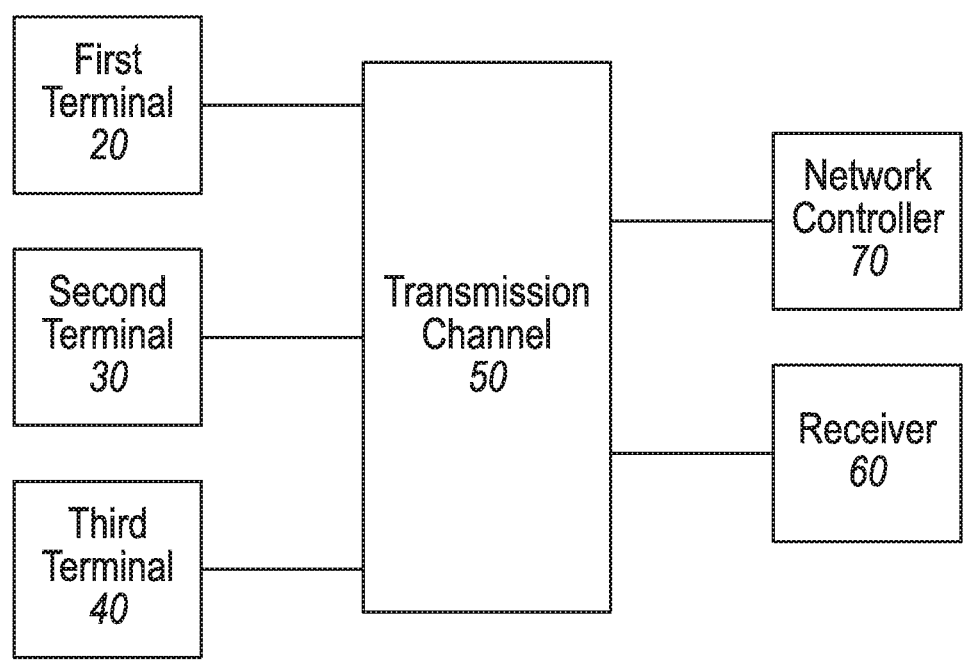
FIG. 1 is a block diagram of an example system for wireless Time-Division Multiple Access (TDMA) communications with overlapped preamble.

As shown in FIG. 1, a system 10 is programmed for wireless Time-Division Multiple Access (TDMA) communications between each of a first terminal 20, a second terminal 30, a third terminal 40, and a receiver 60 via a transmission channel 50. The system 10 schedules burst transmissions (which can also be referred to herein as bursts) through the transmission channel 50 such that a portion of a first burst from the first terminal is overlapped by a portion of a second burst from the second terminal. The term "overlapped" as used herein means transmitted during a same time period. As described in additional detail below with reference to FIG. 2, each burst is a radio frequency transmission including a preamble and a payload, with the preamble preceding the payload. The preamble includes a preamble pattern. The preamble pattern is a symbol pattern that is stored by the receiver 60 in memory and can be used to synchronize reception of the burst. The payload is data intended to be communicated from the terminal to the receiver, e.g., encoded voice or text data. The second burst is subsequent to, and partially overlapping, the first burst.

In one example, a portion of the payload from a first burst in the pair of consecutive bursts may be overlapped by the preamble of a second, subsequent burst in the pair of bursts. Overlapping the portion of the first burst payload with the second burst preamble eliminates the guard time between bursts, and further eliminates the second burst preamble time from the transmission time for the first and second bursts. Reducing the transmission time increases the capacity for the transmission channel 50, resulting in more efficient use of this resource.

Due to factors, such as satellite movement, measurement error, propagation delay, geographical locations of terminal, the actual burst arrival time, as referenced to the expected arrival time arranged by the scheduler, will vary between terminals. These timing variations are taken into account in traditional TDMA system by allocating a guard time between the expected arrival timing from different user terminals to avoid possible overlapping of bursts from different user terminals. Trying to reduce the guard time may result in a portion of a first burst overlapping with a portion of a subsequent second burst from a different terminal. Due to coding redundancy, the system 10 can also accommodate overlaps of this type.

For ease of understanding, the system 10 is described as including first, second and third terminals 20, 30, 40. The system 10, can include a certain number of terminals to achieve certain quality of service. The system 10 further includes a network controller 70 programmed to manage communications between each of the first, second, and third terminals 20, 30, 40 and the receiver 60.

Each of the first, second and third terminals 20, 30, 40, the transmission channel 50, the receiver 60 and the network controller 70 includes one or more signal processors and memories, the memories storing software programming executable by the signal processor(s). Additionally, or alternatively, each of the first, second and third terminals 20, 30, 40, the transmission channel 50, the receiver 60 and the network controller 70 can include hardware and/or firmware.

Each of the first, second and third terminals 20, 30, 40 is programmed to receive a respective schedule from the network controller 70. A schedule in the context of this disclosure means a set of timeslots available for bursts in a terminal such as one of the first, second and third terminals, 20, 30, 40, i.e., in the current example, the respective schedules specify timeslots available for bursts for each of the respective first, second and third terminals 20, 30, 40. Based on the respective schedules, each of the first, second and third terminals 20, 30, 40 transmits bursts via the transmission channel 50 to the receiver 60 during specified timeslots.

The transmission channel 50 is a medium or media for radio frequency communications between the first, second and third terminals 20, 30, 40 and the receiver 60, and sending and receiving devices for such communications. The transmission channel 50 can include, for example, a satellite including one or more repeaters. The repeaters receive bursts from, e.g., the first, second and third terminals 20, 30, 40 and retransmit the bursts to the receiver 60.

The receiver 60 is programmed to receive communication frames including sequential bursts, with each burst including a preamble and a payload. A communications frame is a sequence of bursts from one or more transmitters such as the first, second and third terminals 20, 30, 40 that are intended to be transmitted to a receiver such as the receiver 60. The communications frame may be organized per a protocol, such as a time-division multiple access (TDMA) based protocol.

Within the communications frame, a portion of each burst may be overlapped by a portion of the subsequent burst. For example, in the case of a communications frame including three bursts, a portion of a first payload of the first burst is overlapped with a portion of the second preamble of the second burst. Further, a portion of the second payload is overlapped with a portion of the preamble of a third burst.

The communications frame may include a large number (e.g., tens or hundreds) of bursts. The receiver 60 may be programmed to select smaller sets of consecutive bursts within the communications frame, for example in a range of three to ten, for processing during a cycle of the iterative interference cancellation process.

As described below, the iterative interference cancellation cycle includes a first pass interference cancellation, and one or more successive passes of interference cancellations. The number of bursts included in the iterative interference cancellation cycle may be determined based on an optimization of processing time, memory storage size and performance required for the iterative interference cancellation cycle.

The receiver 60 is programmed to perform an interference cancellation cycle for separating the bursts included in a selected set of bursts from the overlapped subsequent bursts. In the discussions that follow, for ease of discussion, the selected set of bursts will include three bursts. The receiver 60 is programmed to separate the first burst from the overlapped second burst. After separating the first burst from the second burst, the receiver 60 is further programmed to separate the second burst from the overlapped third burst.

After completing the first pass of separating the first, second and third bursts, the receiver 60 may be programmed to execute a second iteration, starting again with separating the first burst from the second burst. During the second iteration, original sample data is replaced with data from initial remodulations of the first, second and third bursts. This process increases the accuracy of the decoding of the first, second and third bursts during the second iteration. Following the second iteration, the receiver 60 may implement additional iterations, with each iteration improving the accuracy of the decoding of the bursts.

In addition to including a preamble, each burst may include a post-amble and/or a mid-amble. For ease of understanding, iterative interference cancellation will first be discussed for a burst that includes a preamble and does not include a post-amble or mid-amble. Handling of bursts including post-ambles and/or mid-ambles will be discussed in reference to FIGS. 9 and 10 below.

The network controller 70 is programmed to generate scheduling instructions for the first, second and third terminals 20, 30, 40 to communicate with the receiver 60, and provides the scheduling instructions to the first, second and third terminals 20, 30, 40. The scheduling instructions specify time slots in a communication frame during which each of the respective first, second and third terminals 20, 30, 40 is authorized to transmit bursts via the transmission channel 50. As described in detail below, the timeslots are specified to overlap such that the portion of the first payload from the first burst can be overlapped in time by the portion of the second preamble from the second transmission.

Figure 2:
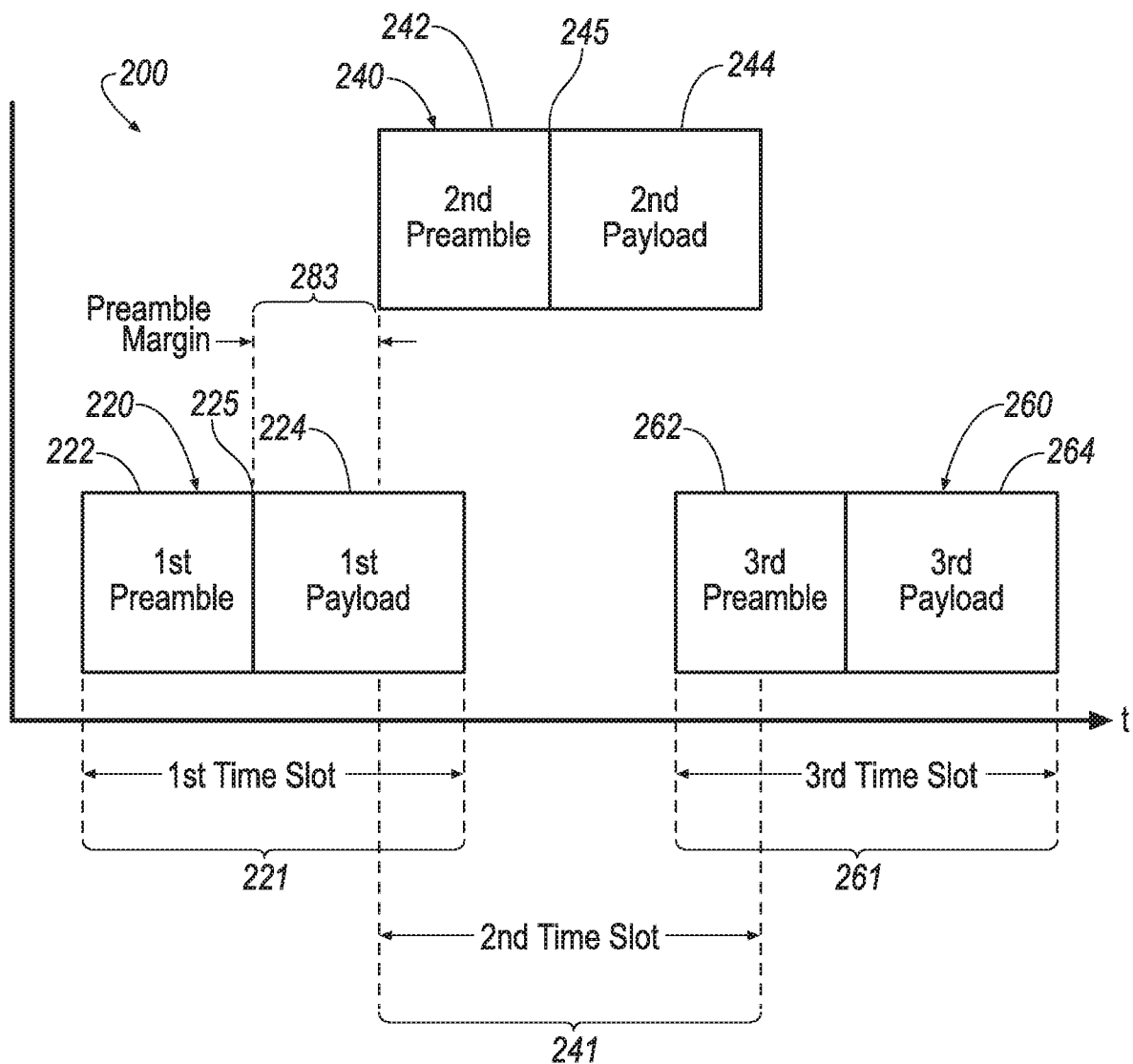
FIG. 2 is a timing diagram illustrating an example of TDMA communications with overlapped preamble.

FIG. 2 is an exemplary timing diagram illustrating an example burst set 200 including overlapped bursts. The burst set 200 may be based on the Time-Division Multiple Access (TDMA) transmission protocol. The burst set 200 includes a first burst 220 in a first timeslot 221, a second burst 240 in a second timeslot 241, and a third burst 260 in a third timeslot 261. The first, second and third bursts 220, 240, 260 may be from different terminals. For example, the first burst 220 may be transmitted from the first terminal 20, the second burst 240 may be transmitted from the second terminal 30 and the third burst 260 may be transmitted from the third terminal 40.

The first burst 220 includes a first preamble 222 and a first payload 224. The second burst 240 includes a second preamble 242 and a second payload 244. The third burst 260 includes a third preamble 262 and a third payload 264.

Each of the first, second and third timeslots 221, 241, 261 is made up of a respective integer number of unit time periods. The respective lengths of each of the first, second and third timeslots 221, 241, 261 may be different from one another. For example, the first timeslot 221 may include one unit time period, and each of the second and third timeslots 241, 261 may include three unit time periods. In this manner, a length of a timeslot, such as the first, second and third timeslots 221, 241, 261, may be adjusted to accommodate a respective payload length, such as the respective first, second and third payloads 224, 244, 264.

Each of the first, second and third preambles to 222, 242, 262 includes respectively a first, second and third preamble pattern. The first second and third preamble patterns are predetermined symbol patterns for the receiver 60 to search for, and are used to provide carrier frequency, phase and symbol timing reference as well as signaling a beginning of the respective first, second and third burst 220, 240, 260. The preamble may or may not include other information as to the modulation and FEC coding of the burst.

The receiver 60 may receive the first, second and third preamble patterns in advance and store them for use in synchronizing with the respective first, second and third burst 220, 240, 260. Each of the first, second and third preamble patterns are typically the same symbol pattern, though this need not be the case.

The first, second and third payloads 224, 244, 264 include the data that is intended to be transmitted respectively in each of the first, second and third bursts 220, 240, 260.

In the burst set 200, the first payload 224 overlaps the second preamble 242, and the second payload 244 overlaps a portion of the third preamble 262. Overlapping the first and second bursts 220, 240 eliminates the use of guard times between the first and second bursts 220, 240, resulting in increased data carrying capacity of the transmission channel 50 relative to standard TDMA.

For TDMA communications, the effectiveness of synchronization depends primarily on the total energy of the preamble pattern. The total energy of the preamble pattern is an integral function of the power level of the preamble pattern over a length of the preamble pattern.

Because, in the system 10, the preamble pattern of a burst (e.g., the second preamble pattern in the second preamble 242) does not take up dedicated time to transmit, the length of the preamble pattern can be increased up to, or almost up to, a length of the preceding payload, minus a preamble margin 283. For example, still referring to FIG. 2, the second timeslot 241 can be specified such that the second preamble 242 starts at a beginning 223 of the first payload 224. To ensure that an overlap does not occur between the first preamble 222 of the first burst 220 and the second preamble 242 of the second burst 240, the network controller 70 may insert the preamble margin 283 between the beginning 223 of the first payload 224 and a beginning of the second preamble 242.

Increasing the length of the preamble pattern allows a reduction of the power level of the preamble pattern, while maintaining the total energy of the preamble pattern. Reducing the power level of the preamble pattern facilitates separating a payload from a simultaneously transmitted preamble pattern, e.g., separating the first payload 224 from the second preamble pattern included in the second preamble 242. Reducing the power level of the preamble may allow a more accurate decoding of the first payload 224 than would occur if the second preamble pattern had been transmitted without reducing the power level.

The network controller 70 may be programmed to schedule a first transmission of the first burst 220 in the first timeslot 221 and to schedule a second transmission of the second burst 240 in the second timeslot 241. The network controller 70 may further be programmed to determine the second timeslot 241 such that a scheduled transmission of the second preamble 242 overlaps a scheduled transmission of the first payload 224.

Figure 3:
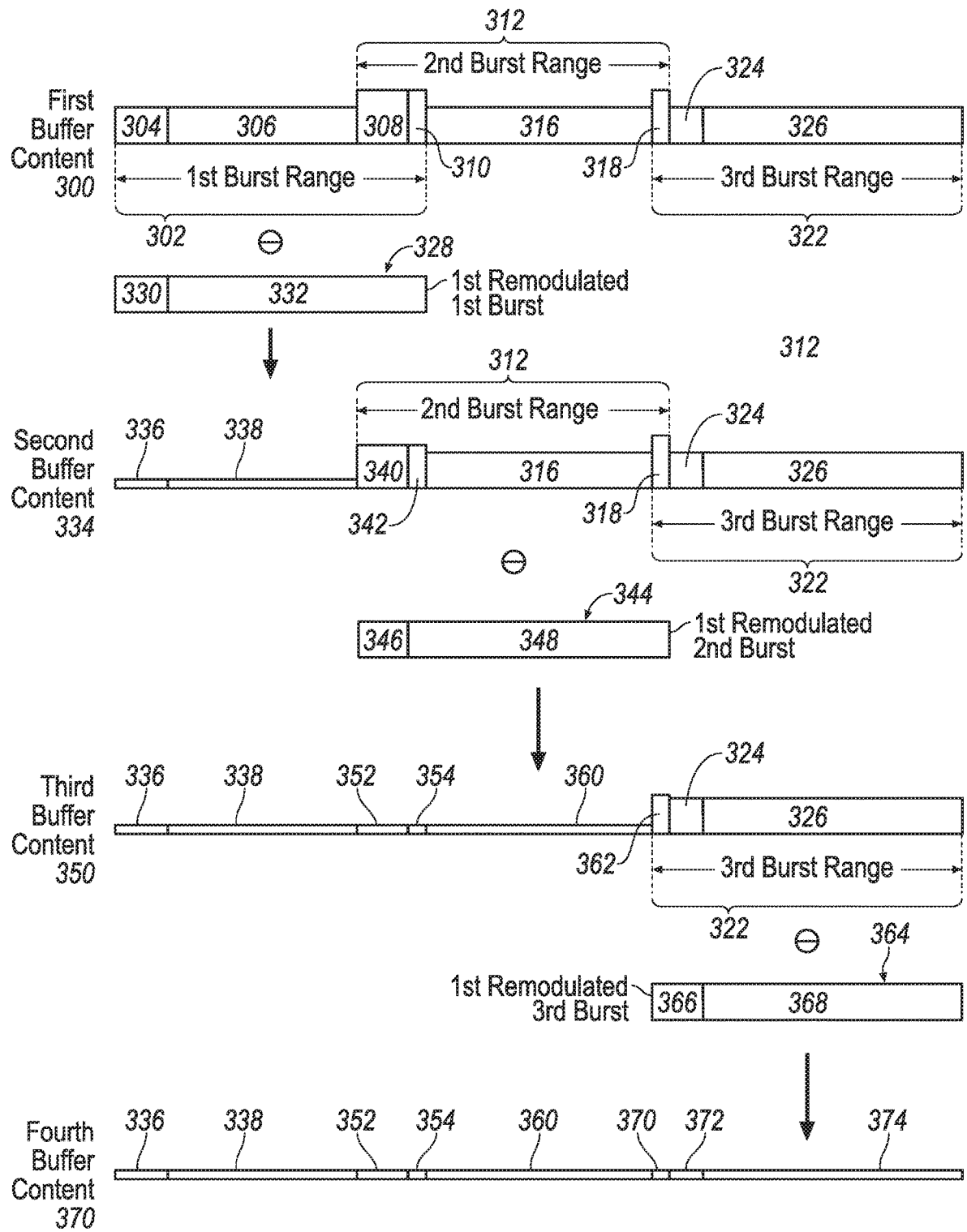
FIG. 3 is a timing diagram illustrating an example first pass of interference cancellation for a set of bursts.
Figure 4:
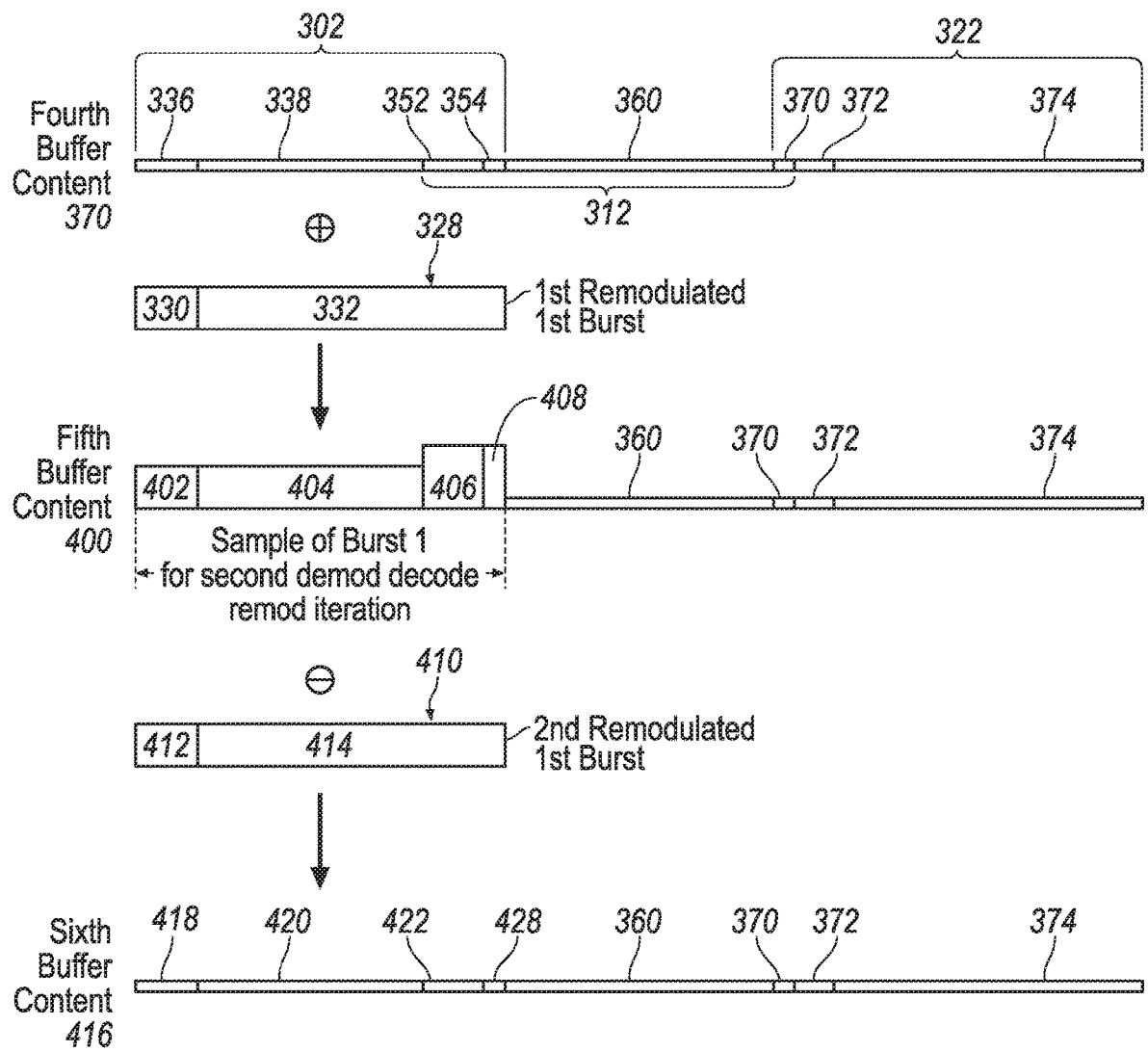
FIG. 4 is a timing diagram illustrating an example iterative pass of interference cancellation for the set of bursts of FIG. 3.

FIGS. 3 and 4 illustrate an exemplary iterative interference cancellation cycle. FIG. 3 illustrates an exemplary first pass of interference cancellation for a burst set including first, second and third bursts. FIG. 4 illustrates an example successive iteration of interference cancellation for the burst set.

Referring to FIG. 3, the receiver 60 receives the burst set and stores a first buffer content 300 in a buffer. The first buffer content 300 is data representing the burst set. The buffer is a portion of a memory included in the receiver 60 or communicatively coupled with the receiver 60. The first buffer content 300 includes the first burst, the second burst and the third burst, with a portion of the first burst overlapped with the second burst, and a portion of the second burst overlapped with the third burst.

For discussion purposes, the first buffer content 300 can be understood to include eight sections. The eight sections and the content of each section are shown in the table 1 below. Each of the preambles includes a preamble pattern. For example, the first burst preamble includes the first burst preamble pattern.

TABLE 1

| Section | Content |
| --- | --- |
| 304 | A first burst preamble |
| 306 | A first portion of a first burst payload |
| 308 | A second portion of the first burst payload overlapped with a second burst preamble |
| 310 | A third portion of the first burst payload overlapped with a first portion of a second burst payload |
| 316 | A second portion of the second burst payload |
| 318 | A third portion of the second burst payload overlapped with a first portion of a third burst preamble |
| 324 | A second portion of the third burst preamble |
| 326 | A third burst payload |

The receiver 60 is programmed to perform preamble acquisition of the first burst. The receiver 60 will search against a specific preamble pattern within an aperture window. For example, the receiver 60 will have information of an expected preamble start position with a certain accuracy. An arrival time uncertainty between user terminals determines an aperture window size. The receiver 60 will search for the preamble start position in the range from the expected preamble start position minus half of the aperture window size to the expected preamble position plus half of the aperture window size.

A first burst sample is the data included in a first burst range 302, wherein the starting of the first burst sample is determined by the preamble acquisition. The first burst range 302 identifies the portion of the first buffer content 300 that includes data from the first burst. In the case of the burst set, the first burst range includes sections 304, 306, 308 and 310.

A burst range, as used herein, is a portion of data (a buffer content) that includes the burst. The preamble of the burst identifies the beginning of the burst. The receiver 60 can determine a beginning of the burst range within a buffer content by synchronizing with the burst preamble.

The receiver 60 receives the length information of the scheduled bursts from the network controller 70, and based on the length, determines an end of the burst range within the buffer content.

The receiver 60 initially synchronizes with the first burst based on the first burst preamble pattern included in section 304. Synchronizing with the first burst is defined as acquiring the frequency, phase, symbol timing and burst timing of the first burst. The first burst in the burst set is designed not to overlap the preceding burst. In the case of a burst index "n" greater than one (for example, for the second burst), overlapping interference from a previous burst has been subtracted from the buffer content prior to synchronization, permitting the $n^{th}$ preamble to be identified.

Upon acquisition of the first burst, and based on the known length of the first burst, the receiver 60 determines the first burst range 302. The receiver 60 then selects the first burst sample from the first burst range 302. Upon acquisition of the first burst, the receiver 60 demodulates and decodes the first burst, to generate a first decoded information of the first burst. Based on the first decoded information of the first burst, the receiver 60 then generates the first remodulated first burst 328. The first remodulated first burst 328 is an approximation of the actual received first burst in the first buffer content 300, and includes a first remodulated first burst preamble 330 and a first remodulated first payload 332.

To generate the first remodulated first burst 328, the receiver 60 initially recodes and remodulates the first decoded information of the first burst to generate the first remodulated first payload 332. The receiver 60 then adds the first remodulated first burst preamble 330 to the first remodulated first payload 332.

Upon generating the first remodulated first burst 328, the receiver 60 subtracts the first remodulated first burst 328 from the first buffer content 300 to generate a second buffer content 334. The second buffer content 334 includes eight sections. The eight sections and the content included in each section appear in Table 2.

TABLE 2

| Section | Content |
|---------|---------|
| 336 | Residual error of first burst preamble |
| 338 | Residual error of first portion of first burst payload |
| 340 | Residual error of the second portion of first burst payload overlapped with the second burst preamble. |
| 342 | Residual error of the third portion of the first burst payload overlapped with the first portion of the second burst payload |
| 316 | The second portion of the second burst payload (unchanged from Table 1) |
| 318 | The third portion of the second burst payload overlapped with a first portion of a third burst preamble (unchanged from Table 1) |
| 324 | The second portion of the third burst preamble (unchanged from Table 1) |
| 326 | The third burst payload (unchanged from table 1) |

Upon generating the second buffer content 334, the receiver 60 is programmed to perform preamble acquisition of the second burst. A second burst sample includes the data in the second buffer content within a second burst range 312, i.e., the sections 340, 342, 316 and 318. Based on the second burst sample, the receiver 60 generates a first remodulated second burst 344. The receiver 60 initially synchronizes with the second burst based on the second burst preamble pattern included in section 340. Upon synchronizing with the second burst, the receiver 60 demodulates the second burst sample and decodes the second burst to generate a first decoded information of the second burst. Then the receiver 60 generates the first remodulated second burst 344 based on the first decoded information of the second burst.

The remodulated second burst 344 is an approximation of the actual received second burst in the first buffer content 300, and includes a first remodulated second preamble 346 and a first remodulated second payload 348. The receiver 60 recodes and remodulates the first decoded information of the second burst to generate the first remodulated second payload 348. The receiver 60 then adds the first remodulated second preamble 346 to the first remodulated second payload 348 to generate the first remodulated second burst 344.

Upon generating the first remodulated second burst 344, the receiver 60 subtracts the first remodulated second burst 344 from the second buffer content 334 to generate a third buffer content 350. The third buffer content 350 includes eight sections. The eight sections and the content included in each section appear in Table 3.

TABLE 3

| Section | Content |
|---------|---------|
| 336 | Residual error of first burst preamble (unchanged from Table 2) |

TABLE 3-continued

| Section | Content |
|---------|---------|
| 338 | Residual error of first portion of first burst payload (unchanged from Table 2) |
| 352 | Residual error of the second portion of first burst payload overlapped with a residual error from the second preamble. |
| 354 | Residual error of the third portion of the first burst payload overlapped with a residual error from the first portion of the second burst payload |
| 360 | Residual error from the second portion of the second burst payload |
| 362 | Residual error from the third portion of the second burst payload overlapped with a first portion of a third burst preamble. |
| 324 | The second portion of the third burst preamble (unchanged from Table 1) |
| 326 | The third burst payload (unchanged from Table 1) |

Upon generating the third buffer content 350, the receiver 60 is programmed to perform preamble acquisition of the third burst. A third burst sample includes the data in the third buffer content 350 within a third burst range 322, i.e., the sections 362, 324 and 326. Based on the third burst sample, the receiver 60 generates a first remodulated third burst 364. The receiver 60 initially synchronizes with the third burst based on the third burst preamble included in sections 362 and 324. Upon synchronizing with the third burst, the receiver 60 demodulates and decodes the third burst to generate a first decoded information of the third burst. third payload 368. Then the receiver 60 generates the first remodulated third burst 364.

The first remodulated third burst 364 is an approximation of the actual received third burst in the first buffer content 300, and includes a first remodulated third preamble 366 and the first remodulated third burst payload 368. The receiver 60 recodes and remodulates the first decoded information of the third burst to generate the first remodulated third payload 368. The receiver 60 then adds the first remodulated third preamble 366 to the first remodulated third payload 368 to generate the first remodulated third burst 364.

Upon generating the remodulated third burst 364, the receiver 60 subtracts the remodulated third burst 364 from the third buffer content 350 to generate a fourth buffer content 370. The fourth buffer content 370 includes eight sections. The eight sections and the content included in each section appear in Table 4.

TABLE 4

| Section | Content |
|---------|---------|
| 336 | Residual error of first burst preamble (unchanged from Table 2). |
| 338 | Residual error of first portion of first burst payload (unchanged from Table 2). |
| 352 | Residual error of the second portion of first burst payload overlapped with a residual error from the second preamble, (unchanged from Table 3). |
| 354 | Residual error of the third portion of the first burst payload overlapped with a residual error from the first portion of the second burst payload (unchanged from Table 3). |
| 360 | Residual error from the second portion of the second burst payload (unchanged from Table 3). |
| 370 | Residual error from the third portion of the second burst payload overlapped with residual error from the first portion of the third burst preamble. |
| 372 | Residual error from the second portion of the third burst preamble. |
| 374 | Residual error from the third burst payload. |

Upon generating the fourth buffer content 370, the first pass of the iterative interference cycle is complete. As described in additional detail with reference to FIG. 5, the receiver 60 may be programmed, upon completing the first pass, to perform one or more additional iterations of interference cancellation.

FIG. 4 illustrates an example of a second iteration of interference cancellation for the burst set.

The second iteration of interference cancellation begins with the fourth buffer content 370, as described above. The receiver 60 is programmed to add the remodulated first burst 328 into the first burst range 302 of the fourth buffer content 370 to generate the fifth buffer content 400. The fifth buffer content 400 includes eight sections. The eight sections and their associated content are shown in Table 5.

TABLE 5

| Section | Content |
|---|---|
| 402 | Residual error of the first burst preamble plus the remodulated first burst preamble 330. The content of section 402 is the same or approximately the same as the original data in section 304 of the first buffer content 300. |
| 404 | Residual error of first portion of first burst payload plus a first portion of the remodulated first payload 332. The content of section 404 is the same or approximately the same as the original data in section 306 of the first buffer content 300. |
| 406 | Residual error of the second portion of first burst payload plus a second portion of the remodulated first payload 332. It is the same as original data in section 308 of the first buffer content 330 minus the interfering part of the first remodulated second burst 346. |
| 408 | Residual error of the third portion of the first burst payload overlapped with a residual error from the first portion of the second burst payload plus a third portion of the remodulated first payload 332. |
| 360 | Residual error from the second portion of the second burst payload (unchanged from Table 3). |
| 370 | Residual error from the third portion of the second burst payload overlapped with residual error from the first portion of the third burst preamble (unchanged from Table 4). |
| 372 | Residual error from the second portion of the third burst preamble (unchanged from Table 4). |
| 374 | Residual error from the third burst payload (unchanged from Table 4). |

Upon generating the fifth buffer content 400, the receiver 60 generates a second remodulated first burst 410. The receiver 60 selects a fourth sample from the first burst range 302. The fourth sample includes the sections 402, 404, 406 and 408 of the fifth buffer content 400. The receiver 60 demodulates and decodes the first burst in the fourth sample to generate a second decoded information of the first burst. The receiver 60 then remodulates the second decoded information of the first burst to generate a second remodulated first payload 414. Based on the second remodulated first payload 414, the receiver 60 then generates the second remodulated first burst 410. The second remodulated first burst 410 includes a second remodulated first preamble 412 and the second remodulated first payload 414.

The receiver 60 is further programmed to subtract the second remodulated first burst 410 from the fifth buffer content 400 to generate the sixth buffer content 416. The sixth buffer content 416 includes eight sections. The eight sections and their associated content are shown in Table 6.

TABLE 6

| Section | Content |
|---|---|
| 418 | Second residual error of first burst preamble. (The same or approximately the same as Section 336 of Table 4.) |
| 420 | Second residual error of first portion of first burst payload. |

TABLE 6-continued

| Section | Content |
|---|---|
| 422 | Second residual error of the second portion of first burst payload overlapped with a residual error from the second burst preamble. |
| 424 | Second residual error of the third portion of the first burst payload overlapped with a residual error from the first portion of the second burst payload. |
| 360 | Residual error from the second portion of the second burst payload (unchanged from Table 3). |
| 370 | Residual error from the third portion of the second burst payload overlapped with residual error from the first portion of the third burst preamble (unchanged from Table 4). |
| 372 | Residual error from the second portion of the third burst preamble (unchanged from Table 4). |
| 374 | Residual error from the third burst payload (unchanged from Table 4). |

The second iteration of interference cancellation continues in a similar manner with the second burst and the third burst. That is, for the second burst, the receiver 60 adds the first remodulated second burst 344 into the second burst range 312 of the sixth buffer content 416 to generate a seventh buffer content. The receiver 60 then selects a fifth sample from the second burst range 312. The receiver 60 synchronizes with the second preamble pattern in the seventh buffer content. The receiver 60 demodulates and decodes the second burst based on the fifth sample to generate a second decoded information of the second burst. The receiver 60 generates a second remodulated second payload based on the second decoded information of the second burst. The receiver 60 then generates a second remodulated second burst including a second remodulated second preamble and the second remodulated second payload. The receiver 60 then subtracts the second remodulated second burst from the seventh buffer content to generate an eighth buffer content.

Similarly, the receiver 60 performs a second iteration of interference cancellation for the third burst. The receiver 60 adds the first remodulated third burst 364 to the eighth buffer content in the third burst range 322 to generate a ninth buffer content. The receiver 60 then selects a sixth sample from the third burst range 322 of the eighth buffer content. The receiver 60 demodulates and decodes the third burst to generate a second decoded information of the third burst. The receiver 60 generates a second remodulated third payload based on the second decoded information of the third burst. The receiver 60 then generates a second remodulated third burst including a second remodulated third preamble and the second remodulated third payload. The receiver 60 can then subtract the second remodulated third burst from the ninth buffer content to generate a tenth buffer content.

Figure 5A:
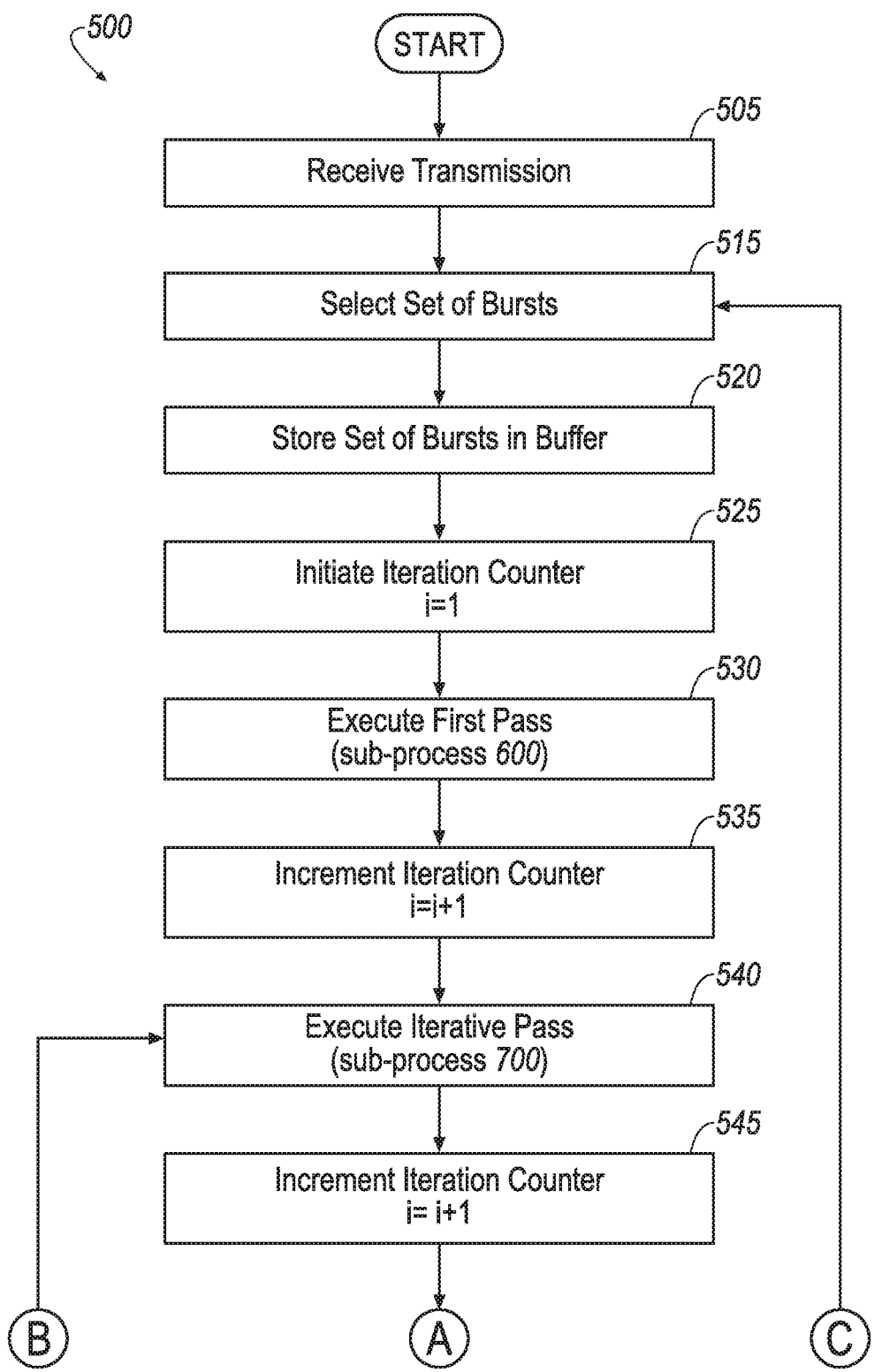
FIG. 5A is a first portion of a process flow diagram of an example process for interference cancellation including first and iterative passes of interference cancellation.
Figure 5B:
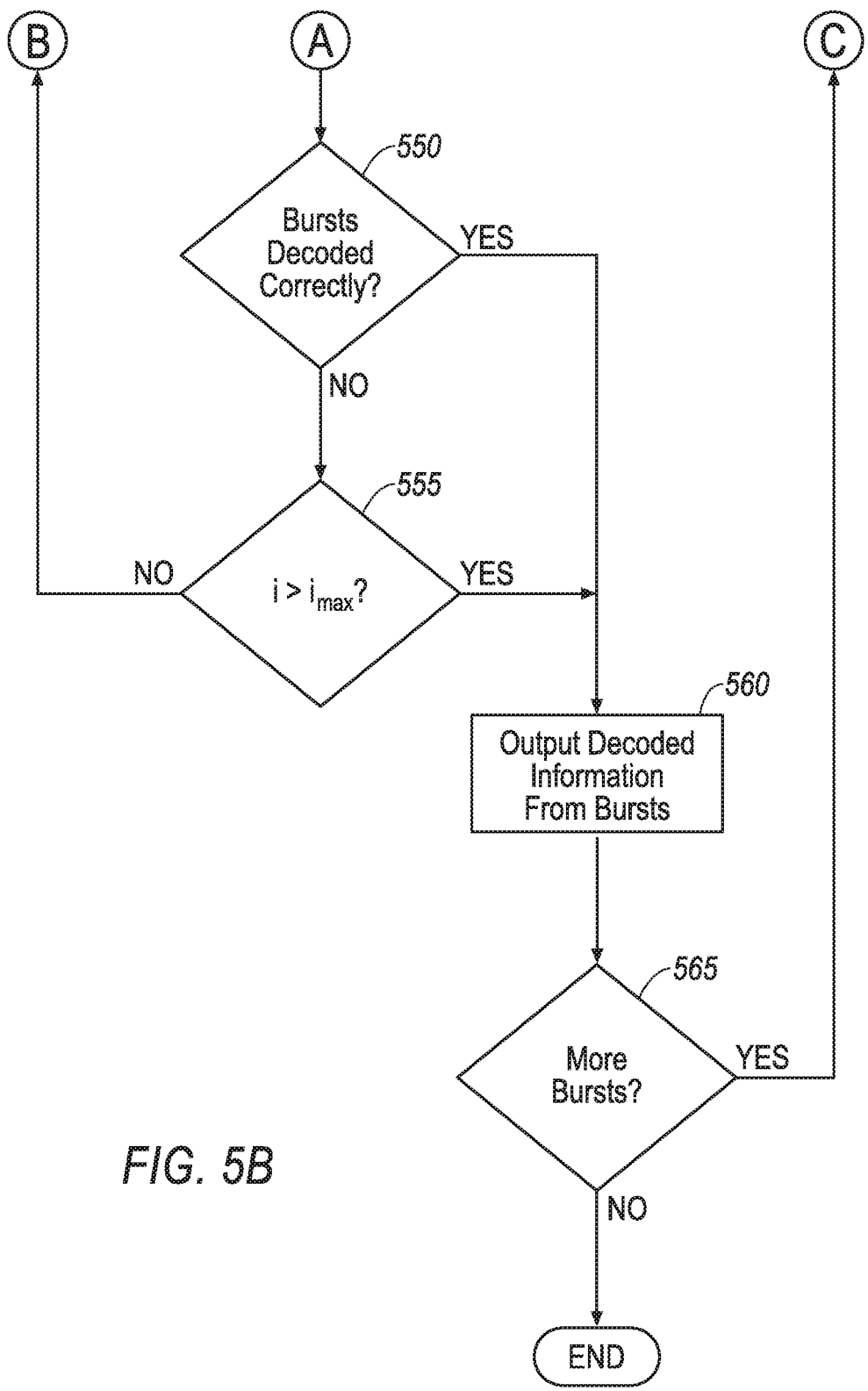
FIG. 5B is a second portion of the process flow diagram of FIG. 5A.

FIG. 5 is a flow diagram of an exemplary process 500 for an iterative interference cancellation cycle including first and iterative passes. The process 500 includes sub-processes 600 and 700, shown respectively in FIGS. 6 and 7, and references the timing diagrams shown in FIGS. 3 and 4. The process 500 begins in a block 505.

In the block 505, the receiver 60 receives a transmission. The transmission includes two or more bursts. As described above, portions of bursts may overlap with portions of preceding and succeeding bursts. As the transmission is received, the receiver 60 stores the transmission in intermediate data storage. The intermediate data storage may be memory included in, or communicatively coupled with, the receiver 60. Upon receiving and storing the transmission, or an initial portion of the transmission, the process 500 continues in a block 515.

In the block 515, the receiver 60 selects a burst set within the transmission for processing. The receiver 60 may select a predetermined number of consecutive bursts to process from the transmission data storage. The predetermined number may be based on an optimization of throughput of bursts through iterative interference cancellation. Typically, the number of bursts in the set is selected such that the final performance, buffer size and processing delay is acceptable.

In the example process 500, the burst set includes three bursts. The three bursts are referred to as the first, second and third bursts. This is only an example. The burst set may include two or more bursts.

Upon selecting the burst set, the process 500 continues in a block 520.

In the block 520, the receiver 60 stores the three bursts in a first buffer content 300 (FIG. 3). The process 500 continues in a block 525.

In the block 525, the receiver 60 initiates an iteration counter i=1. The iteration counter i is an index used in the process 500 to identify which iteration of the iterative interference cancellation cycle is currently being processed. The iteration counter index i may also be used to identify from which iteration a set of data (for example, a remodulated burst) is taken. The iteration counter i=1 refers to the first pass of the iterative interference cancellation cycle. Upon setting i=1, the process 500 continues in a block 530.

In the block 530, the process 500 executes the first pass of the iterative interference cancellation. The process 500 calls an exemplary sub-process 600.

Within the exemplary sub-process 600, and as described in additional detail below with reference to FIG. 6, the receiver 60 successively synchronizes with, demodulates, decodes, recodes and remodulates each of the first, second and third bursts. Upon remodulating each of the first, second and third bursts, the receiver 60 subtracts the remodulated first, second and third bursts from the buffer content. Demodulating, decoding, recoding, remodulating and subtracting a burst from the buffer content permits separation of overlapped portions of successive bursts. Upon completing the first pass (sub-process 600), the process 500 continues in a block 535.

In the block 535, the receiver 60 increments the iteration counter i=i+1. The process 500 continues in a block 540.

In the block 540, which can follow the block 535 or a block 555, the receiver 60 implements an iterative pass of the iterative interference cancellation cycle. The receiver 60 calls an exemplary sub-process 700, as described in additional detail in reference to FIG. 7, below.

Within the exemplary sub-process 700, the receiver 60 successively adds a remodulated first, second and third burst back into the buffer content. Upon adding respectively each of the first, second and third bursts back into the buffer content, the receiver 60 synchronizes with, demodulates, decodes, recodes, remodulates, and subtracts back out of the buffer content the first, second and third burst. According to this process, residual error contained in the buffer content from a previous iteration is reduced. Upon completing the iterative pass (sub-process 700), the process 500 continues in a block 545.

In the block 545, the receiver 60 increments the iteration counter i=i+1. The process 500 continues in a block 550.

In the block 550, the receiver 60 determines whether the first, second and third bursts are decoded correctly. For example, the receiver 60 may use cyclic redundancy check (CRC) and/or parity checking, as is known, to determine whether the first, second and third bursts are correctly decoded. In the case that the receiver 60 determines that the first, second and third bursts are correctly decoded, the process 500 continues in a block 560. In the case that the receiver 60 determines that one or more of the first, second and third bursts is not correctly decoded, the process 500 continues in a block 555.

In the block 555, the receiver 60 determines whether the iteration index is greater than a maximum number of iterations $i_{max}$. The maximum number of iterations $i_{max}$ may be a predetermined number of iterations that the receiver 60 can complete within a time period required to receive the burst set. In the case that the iteration index is greater than the maximum number of iterations $i_{max}$, the process 500 continues in a block 560. Otherwise, the process 500 continues in the block 540, and executes an additional iteration of iterative interference cancellation cycle.

In the block 560, the receiver 60 outputs the decoded information from the first, second and third bursts. The process 500 then continues in a block 565.

In the block 565, which can follow the block 550 or 555, the receiver 60 determines whether the receiver 60 has received additional bursts. In the case that the receiver 60 has received additional bursts, the process 500 continues in the block 515. The receiver 60 begins an iterative interference cancellation cycle on a new burst set. Otherwise, the process 500 ends.

Figure 6:
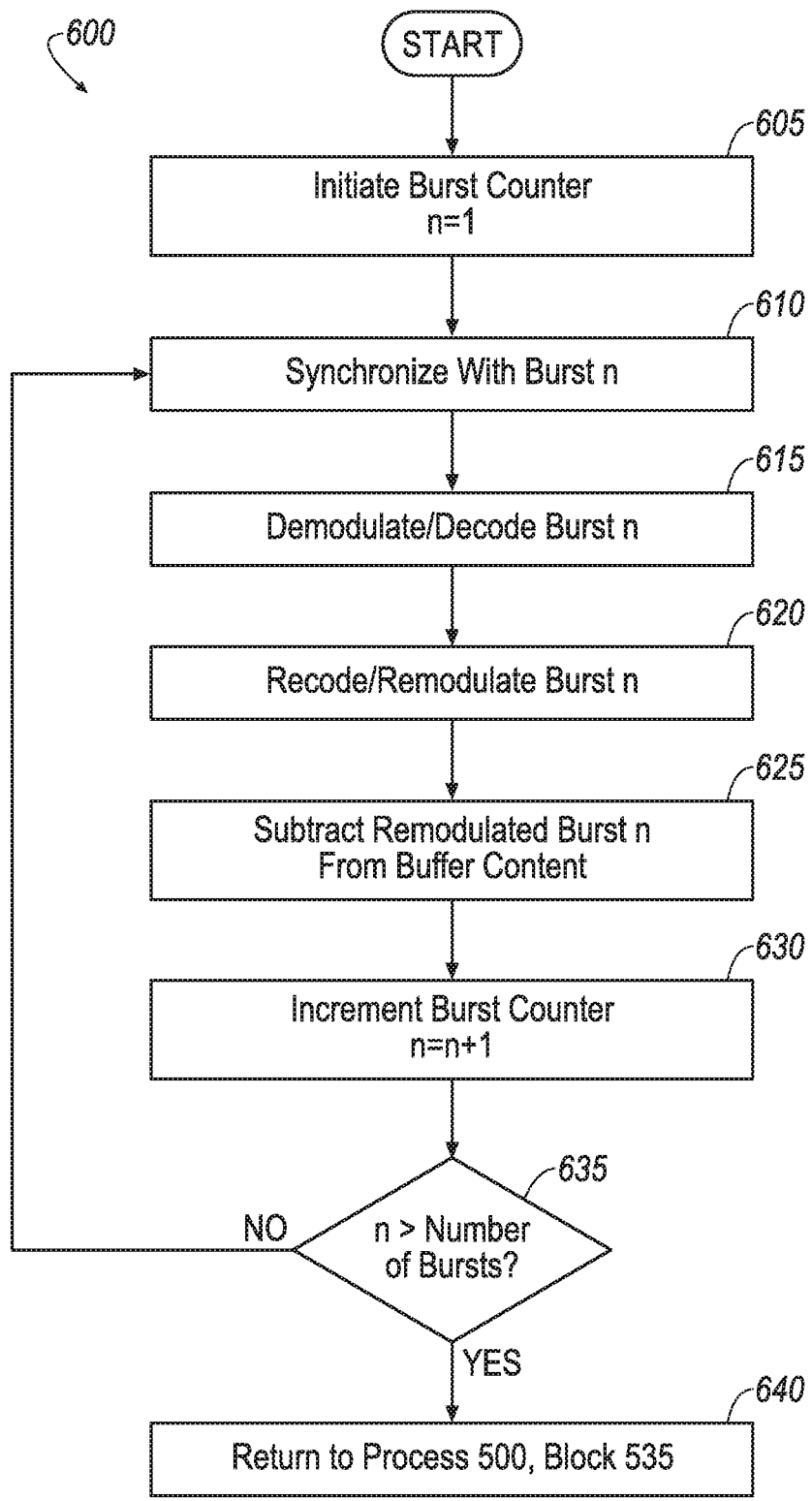
FIG. 6 is a flow diagram for an example sub-process for the first pass of interference cancellation of FIG. 3.

FIG. 6 is a flow diagram of an exemplary sub-process 600 for the first pass of the iterative interference cancellation cycle. The sub-process 600 begins in a block 605.

In the block 605, the receiver 60 initiates a burst counter n=1. The burst counter is an index that keeps track of which burst is currently being processed. Upon initiating the burst counter, the sub-process 600 continues in a block 610.

In the block 610, the receiver 60 synchronizes with the $n^{th}$ burst in the buffer content. For example, referring to FIG. 3, for n=1, the receiver 60 synchronizes with the first burst in the first burst range 302 of the first buffer content 300. The first burst is included in sections 304, 306, 308 and 310 in the first buffer content 300.

The receiver 60 synchronizes with the $n^{th}$ burst by looking for a known preamble pattern within the first preamble, included in the section 304, as is known. Upon synchronizing with the $n^{th}$ burst, the sub-process 600 continues in a block 615.

In the block 615, the receiver 60 demodulates, and decodes the $n^{th}$ burst. For example, for n=1, the receiver 60 demodulates and decodes the first burst. Referring again to FIG. 3, the receiver 60 demodulates and decodes the first burst from the first burst range 302 including sections 304, 306, 308 and 310 to generate a first decoded information of the first burst. Upon generating the first decoded information of the first burst, the sub-process 600 continues in a block 620.

In the block 620, the receiver 60 recodes and remodulates the $n^{th}$ burst, to generate the first remodulated first burst 328. For example, for n=1, the receiver 60 recodes and remodulates the first decoded information of the first burst to generate the first remodulated first payload 332. The receiver 60 then adds the first burst preamble 330 to the first remodulated first payload 332 to generate the first remodulated first burst 328. Upon generating the remodulated $n^{th}$ burst, the sub-process 600 continues in a block 625.

In the block 625, the receiver 60 generates an updated buffer content by subtracting the remodulated $n^{th}$ burst from the current buffer content. For example, for n=1, and referring to FIG. 3, the receiver 60 subtracts the first remodulated first burst 328 from the first buffer content 300 and updates the buffer with the resulting second buffer content 334. The sub-process 600 then continues in a block 630.

In the block 630, the receiver 60 increments the burst counter n=n+1. Upon incrementing the burst counter, the sub-process 600 continues in a block 635.

In the block 635, the receiver 60 determines whether the burst counter is greater than the number of bursts in the burst set. In the case that the burst counter is greater than the number of bursts, the sub-process 600 continues in a block 640. In the case that the burst counter is less than or equal to the number of bursts in the burst set, the sub-process 600 continues in the block 610. The receiver 60 begins processing of the next burst in the burst set.

In the block 640, the receiver 60 returns to the process 500, at the block 535.

Figure 7:
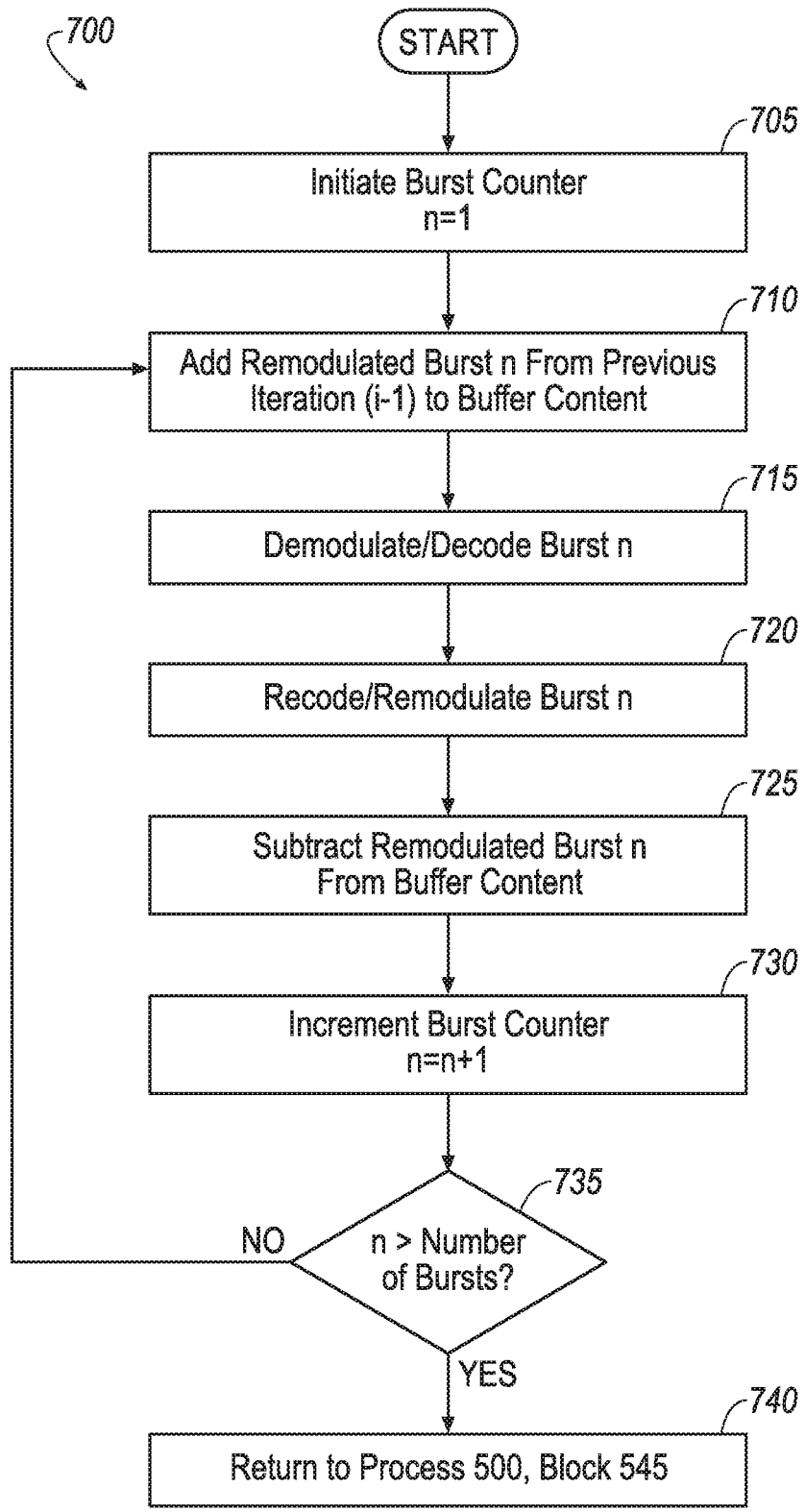
FIG. 7 is a flow diagram for an example sub-process for the iterative pass of interference cancellation of FIG. 4.

FIG. 7 is a flow diagram of an exemplary sub-process 700 for the iterative pass of the iterative interference cancellation cycle. The sub-process 700 begins in a block 705.

In the block 705, the receiver 60 initiates the burst counter n=1. Upon initiating the burst counter, the sub-process 700 continues in a block 710.

In the block 710, the receiver 60 adds the remodulated $n^{th}$ burst from the previous iteration into the buffer content. For example, for n=1, in a second iteration (i=2), the receiver 60 adds the first remodulated first burst into the memory content. Referring to FIG. 4, this corresponds to adding the first remodulated first burst 328 into the fourth buffer content 370.

Upon adding the remodulated $n^{th}$ burst from the previous iteration into the buffer content, the sub-process 700 continues in a block 715.

In the block 715, the receiver 60 demodulates and decodes the burst n to generate an $i^{th}$ decoded information of the $n^{th}$ burst. For the case of i=2 and n=1, and referring to FIG. 4, this corresponds to generating second decoded information of the first burst by demodulating and decoding the first burst as contained in the sections 402, 404, 406 and 408. Upon generating the $i^{th}$ decoded information of the $n^{th}$ burst, the sub-process 700 continues in a block 720.

In the block 720, the receiver 60 generates the $i^{th}$ remodulated $n^{th}$ burst. Referring to FIG. 4, for i=2 and n=1, the receiver 60 recodes and remodulates the $2^{nd}$ decoded information of the first burst to generate the second remodulated first payload 414. The receiver 60 then generates the second remodulated first burst 410 by adding the first burst preamble 330 to the second remodulated first payload 414 The sub-process 700 then continues in a block 725.

In the block 725, the receiver 60 generates an updated buffer content by subtracting the $i^{th}$ remodulated $n^{th}$ burst from the current buffer content. The receiver 60 then updates the buffer with the updated buffer content. For the case of i=2 and n=1, this corresponds to subtracting the $2^{nd}$ remodulated first burst 410 from the fifth buffer content 400 to generate the sixth buffer content 416. The sub-process 700 then continues in a block 730.

In the block 730, the receiver 60 increments the burst counter n=n+1. The sub-process 700 then continues in a block 735.

In the block 735, the receiver 60 determines whether the burst counter is greater than the number of bursts in the burst set. In the case that the burst counter is greater than the number of bursts, the sub-process 700 continues in a block 740. In the case that the burst counter is less than or equal to the number of bursts in the burst set, the sub-process 700 continues in the block 710. The receiver 60 begins processing of the next burst in the burst set.

In the block 740, the receiver 60 returns to the process 500, at the block 545.

In some cases, the network controller 70 may schedule consecutive bursts with a payload margin that reduces the likelihood of an overlap between a payload of a first burst and a payload of a successive second burst. This is illustrated in FIG. 8.

Figure 8:
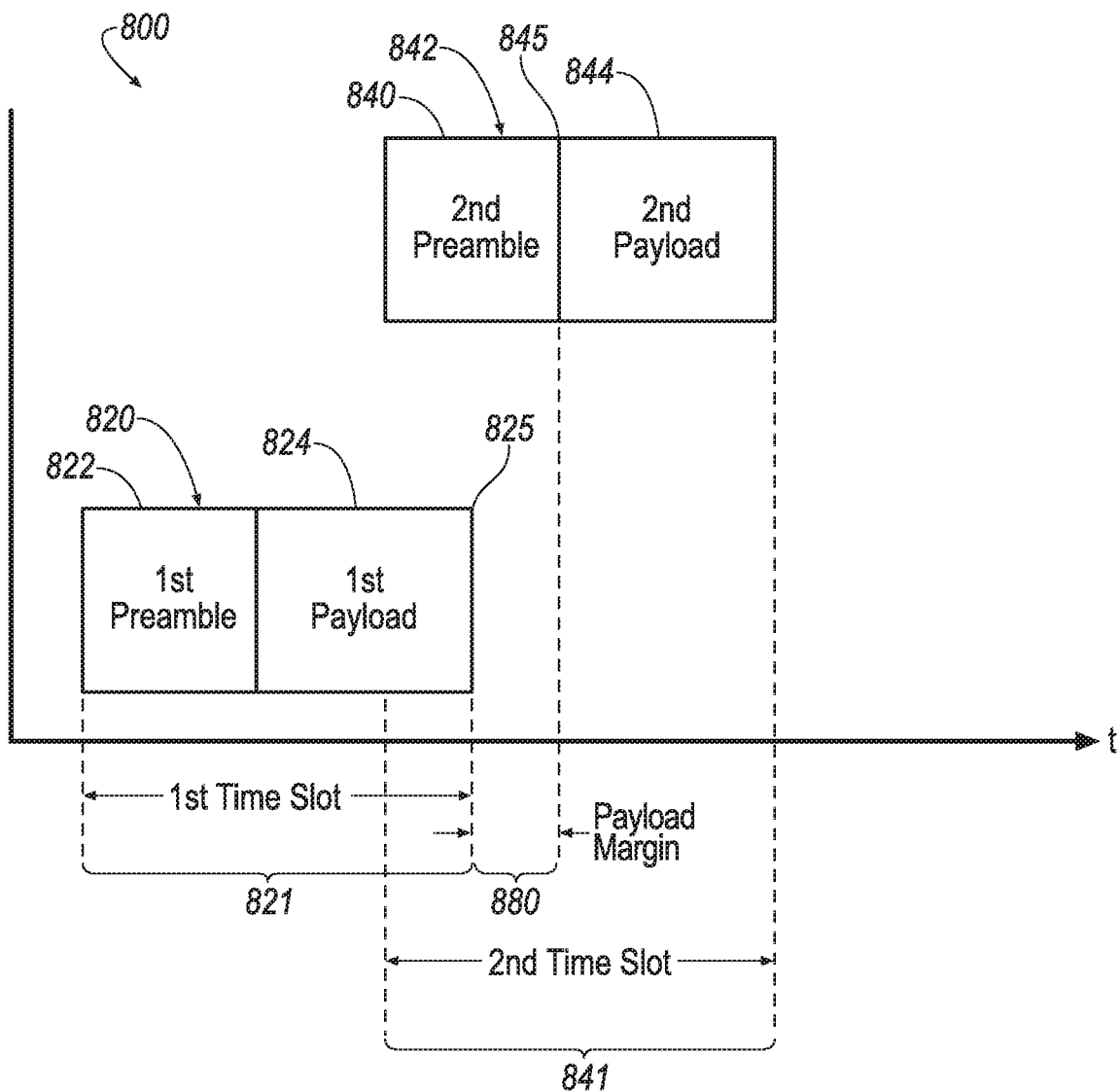
FIG. 8 is a timing diagram illustrating an example of TDMA communications with overlapped preamble including guard times.

In FIG. 8, an exemplary burst set 800 includes a first burst 820 and a second burst 840. The first burst is scheduled in a first time slot 821, and includes a first preamble 822 and a first payload 824. The second burst is scheduled in a second time slot and includes a second preamble 842 and a second payload 844.

In the exemplary burst set 800, the second time slot 841 is scheduled relative to the first time slot 821 such that a payload margin 880 occurs between an end 825 of the first payload 824, and a beginning 845 of the second payload 844. The payload margin 880 is a scheduled period of time to reduce or eliminate a likelihood of an overlap between the first and second payloads. The payload margin 880 can be determined to be large enough to accommodate a maximum variation in a timing of the first burst 820 relative to the second burst 840 without creating an overlap between the first payload 824 and the second payload 844.

As noted above, in some cases, in addition to a preamble, a burst may include a post-amble and/or one or more mid-ambles. The respective lengths of the preamble, the one or more mid-ambles and the post-amble may or may not be the same. Like the preamble, the post-amble and, when applicable, the one or more mid-ambles, include a known sequence of symbols, that allow the receiver 60 to synchronize a reception of a burst.

Figure 9:
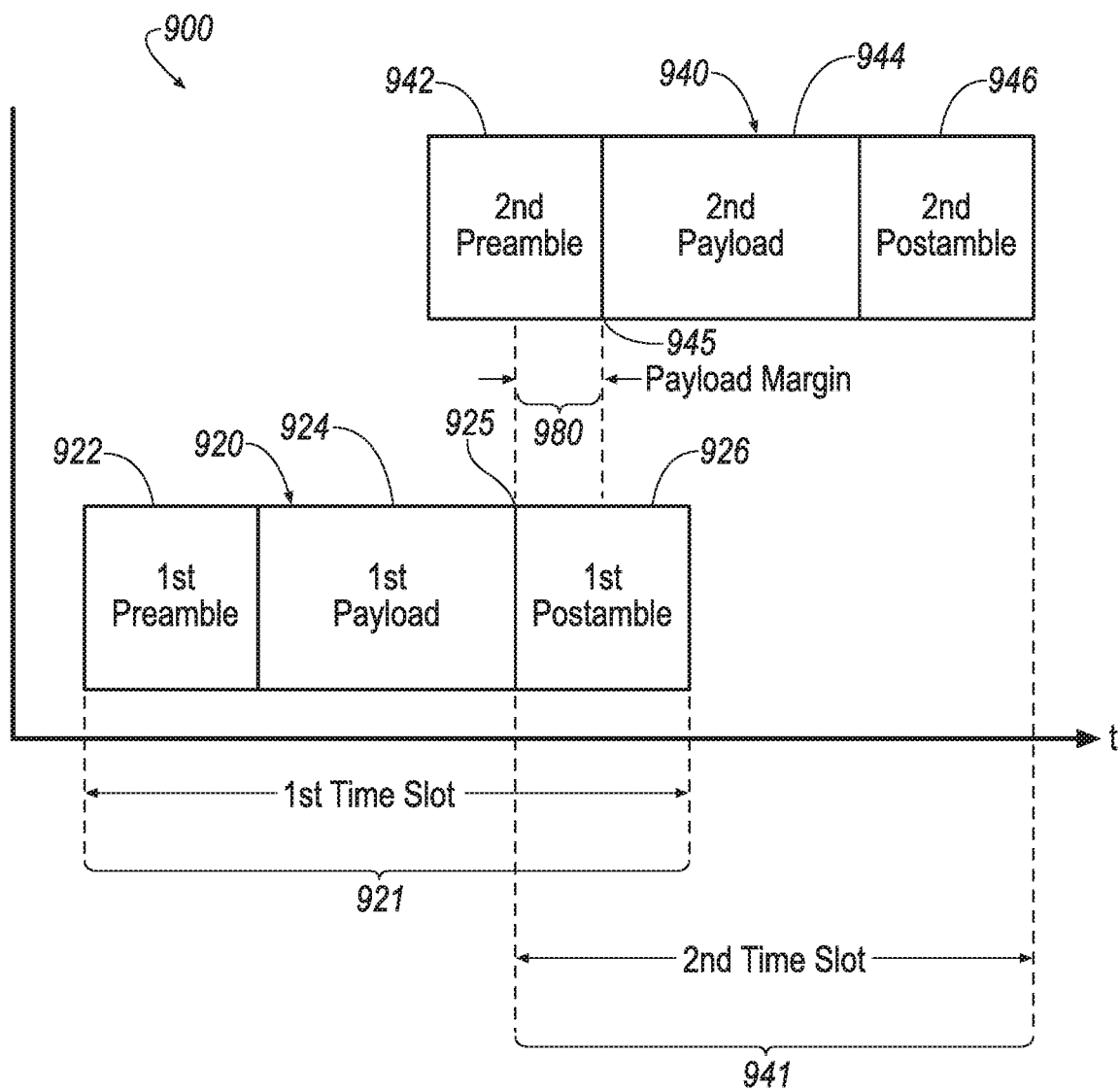
FIG. 9 is a timing diagram illustrating an example of TDMA communications with overlapped preamble and post-amble.

FIG. 9 is an exemplary timing diagram illustrating an example burst set 900 of TDMA communication with overlapped preamble and post-amble. As described below, the post-amble includes a post-amble pattern that can be used by the receiver 60 for synchronization. The preamble and post-amble may or may not be a same length. The example burst set 900 includes a first burst 920 in a first timeslot 921, a second burst 940 and a second timeslot 941.

The first burst 920 includes a first preamble 922, a first payload 924 and a first post-amble 926. The second burst 940 includes a second preamble 942, a second payload 944 and a second post-amble 946. The first and second preambles 922, 942 include respective first and second preamble patterns and the first and second post-ambles 926, 946 include respective first and second post-amble patterns.

The first and second payloads 924, 944 include the data that is intended to be transmitted respectively by each of the first and second bursts 920, 940.

The burst set 900 includes an optional payload margin 980 between an end 925 of the first payload 924 and a beginning 945 of the second payload 944. The payload margin 980 can be selected to ensure that uncertainty in timing between, for example, the first and second terminals 20, 30 does not result in an overlap of the first payload 924 with the second payload 944.

The iterative interference cancellation cycle, as described above, applies equally to bursts including post-ambles, such as the first and second bursts 920, 940. The first and second post-ambles 926, 946 can be transmitted at a same power level as the respective first and second payloads 924, 944. Once the payload associated with the post-amble (for example, the first payload 924 associated with the first post-amble 926), is demodulated and decoded, the remaining portion of the first burst 920 is the post-amble 926. The post-amble 926 can be subtracted to remove its interference on the second burst 940.

As shown in FIG. 9, part of the post-amble 926 may overlap the payload margin 980 intended to avoid overlap between the first payload 924 and the second payload 944.

Figure 10:
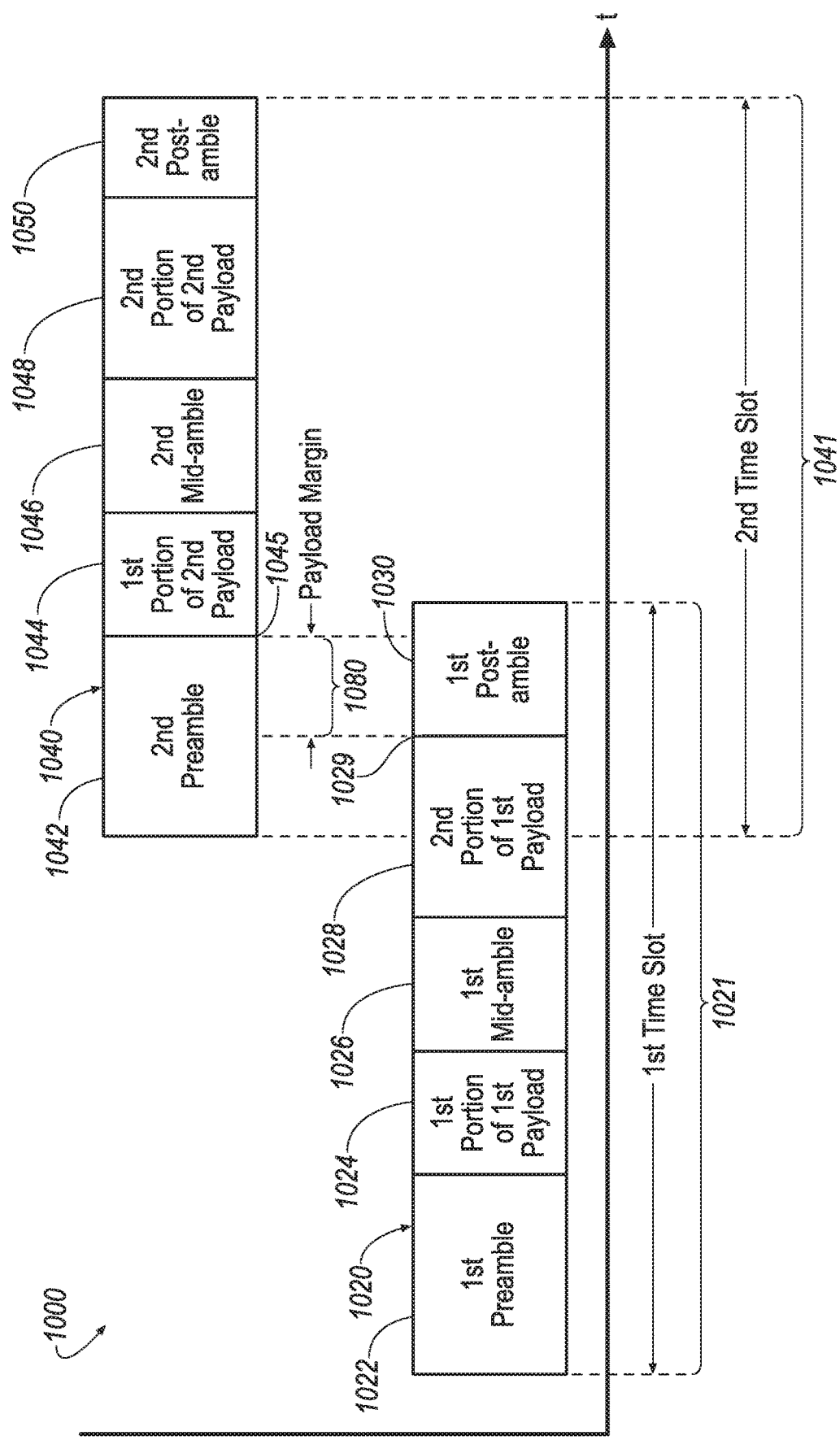
FIG. 10 is a timing diagram illustrating an example of TDMA communications with overlapped preamble and post-amble and a non-overlapped mid-amble.

FIG. 10 is an exemplary timing diagram illustrating an example burst set 1000 of TDMA communication including first and second bursts 1020, 1040 in respective first and second timeslots 1021, 1041.

The first burst 1020 includes a first preamble 1022, a first portion of a first payload 1024 and a mid-amble 1026, a second portion of the first payload 1028 and a post-amble 1030. The second burst 1040 includes a second preamble 1042, a first portion of a second payload 1044 and a mid-amble 1046, a second portion of the second payload 1048 and a second post-amble 1050. The first and second preambles 1022, 1042 include first and second preamble patterns. The first and second mid-ambles 1026, 1046 include first and second mid-amble patterns. The first and second post-ambles 1030, 1050 include first and second post-amble patterns. The receiver 60 can use each of the first and second preamble patterns, first and second mid-amble patterns and first and second post-amble patterns for synchronization when receiving the respective first and second bursts 1020, 1040.

The data intended to be transmitted by the first burst 1020 is divided between the first portion of the first payload 1024 and the second portion of the first payload 1028. The data intended to be transmitted by the second burst 1040 is divided between the first portion of the second payload 1044 and the second portion of the second payload 1048.

The burst set 1000 includes a payload margin 1080 between an end 1025 of the second portion of the first payload 1028 and a beginning 1045 of a first portion of the second payload 1044.

The iterative interference cancellation process, as described above, can also be applied to bursts including mid-ambles and post-ambles, such as the first and second bursts 1020, 1040. The respective first and second post-ambles 1030, 1050 can be handled as described above with regard to the example set of three bursts included in the first buffer content 300 in FIG. 3. The respective first and second mid-ambles 1026, 1046 can be treated as payload data.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random-access memory, etc.

A computer-readable medium includes any medium that participates in providing data (e.g., instructions), which may be read by a computer, signal processor or the like. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer, signal processor, or the like can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The "Abstract" submitted herewith is provided as set forth in 37 C.F.R § 1.72. As stated in 37 C.F.R. § 1.72(b), the present Abstract is submitted to describe the "technical disclosure in the specification, and "[t]he purpose of the The invention clamid is:

1. A receiver, comprising:
    a signal processor; and
    a memory, the memory storing instructions executable by the signal processor such that the signal processor is programmed to:
        using a predetermined schedule, receive a transmission comprising a time-division multiple access (TDMA) frame,
        wherein the predetermined schedule comprises a plurality of TDMA timeslots, wherein the plurality of TDMA timeslots comprise a first TDMA timeslot having a duration defined by a first time interval and a second TDMA timeslot having a duration defined by a second time interval, wherein a portion of the second time interval overlaps in time with the first time interval,
        wherein receiving the TDMA frame comprises receiving a first burst (that comprises a first preamble and a first payload) in the first TDMA timeslot and receiving a second burst (that comprises a second preamble and a second payload) in the second TDMA timeslot, wherein the first burst and at least a portion of the second preamble are received concurrently;
        store the first burst and the second burst in a buffer;
        perform iterative interference cancellation to extract a first message from the first payload, wherein extracting the first message from the first payload comprises demodulating and decoding the first burst;
        perform iterative interference cancellation to extract a second message from the second payload by:
            determining a remodulated and recoded first burst by recoding and remodulating the demodulated and decoded first burst;
            determining a residual by subtracting the remodulated and recoded first burst from the first burst and the second preamble stored in the buffer; and
            demodulating and decoding the residual stored in the buffer.

2. The receiver of claim 1, wherein the TDMA frame comprises a third burst (that comprises a third preamble and a third payload), wherein the third preamble is received concurrently with a portion of the second payload and stored in the buffer, and further comprising instructions to perform iterative interference cancellation to extract a third message from the third payload by demodulating and decoding the residual stored in the buffer.

3. The receiver of claim 1, wherein a predetermined quantity of iterations are performed during iterative interference cancellation.

4. The receiver of claim 1, wherein the first preamble comprises a first predetermined pattern, wherein the second preamble comprises a second predetermined pattern, wherein the first and second predetermined patterns are used by the receiver for burst synchronization.

5. The receiver of claim 4, wherein the first and second predetermined patterns are the same.

6. The receiver of claim 1, wherein the instructions further comprise signal processor is further programmed to identify the first burst using the first preamble.

7. The receiver of claim 1, wherein an energy level of the first preamble is less than an energy level of the first payload, wherein the energy levels are used during iterative interference cancellation.

8. A method, comprising:
    using a predetermined schedule, receiving, at a wireless receiver, a transmission comprising a time-division multiple access (TDMA) frame,
    wherein the predetermined schedule comprises a plurality of TDMA timeslots, wherein the plurality of TDMA timeslots comprise a first TDMA timeslot having a duration defined by a first time interval and a second TDMA timeslot having a duration defined by a second time interval, wherein a portion of the second time interval overlaps in time with the first time interval,
    wherein receiving the TDMA frame comprises receiving a first burst (that comprises a first preamble and a first payload) in the first TDMA timeslot and receiving a second burst (that comprises a second preamble and a second payload) in the second TDMA timeslot, wherein the first burst and at least a portion of the second preamble are received concurrently;
    storing the first burst and the second burst in a buffer;
    performing iterative interference cancellation to extract a first message from the first payload, wherein extracting the first message from the first payload comprises demodulating and decoding the first burst;
    perform iterative interference cancellation to extract a second message from the second payload by:
        determining a remodulated and recoded first burst by recoding and remodulating the demodulated and decoded first burst;
        determining a residual by subtracting the remodulated and recoded first burst from the first burst and the second preamble stored in the buffer; and
        demodulating and decoding the residual stored in the buffer.

9. The method of claim 8, wherein the TDMA frame comprises a third burst (that comprises a third preamble and a third payload), wherein the third preamble is received concurrently with a portion of the second payload and stored in the buffer, and further comprising instructions to perform iterative interference cancellation to extract a third message from the third payload by demodulating and decoding the residual stored in the buffer.

10. The method of claim 8, wherein a predetermined quantity of iterations are performed during iterative interference cancellation.

11. The method of claim 8, wherein the first preamble comprises a first predetermined pattern, wherein the second preamble comprises a second predetermined pattern, wherein the first and second predetermined patterns are used by the receiver for burst synchronization.

12. The method of claim 11, wherein the first and second predetermined patterns are the same.

13. The method of claim 8, further comprising identifying the first burst using the first preamble.

14. The method of claim 8, wherein an energy level of the first preamble is less than an energy level of the first payload, wherein the energy levels are used during iterative interference cancellation.

* * * * *

UNITED STATES PATENT AND TRADEMARK OFFICE
CERTIFICATE OF CORRECTION

PATENT NO. : 10,812,250 B2
APPLICATION NO. : 15/720124
DATED : October 20, 2020
INVENTOR(S) : Lin-Nan Lee and Liping Chen Page 1 of 1

It is certified that error appears in the above-identified patent and that said Letters Patent is hereby corrected as shown below:

In the Claims

Column 20, in Lines 1-2, Claim 6, replace "the instructions further comprise signal" with -- the signal --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*